Feb. 18, 1936.  J. W. LEIGHTON  2,031,493
SPRING BOLT ASSEMBLY
Filed June 9, 1934

INVENTOR.
John W. Leighton.
BY
Harness, Dickey, Pierce & Hann.
ATTORNEYS.

Patented Feb. 18, 1936

2,031,493

UNITED STATES PATENT OFFICE 2,031,493

SPRING BOLT ASSEMBLY

John W. Leighton, Port Huron, Mich.

Application June 9, 1934, Serial No. 729,880

19 Claims. (Cl. 267—54)

The invention relates to pivotal connections and it has particular relation to a connection for pivotally mounting one end of a spring on a motor vehicle.

One object of the invention is to provide an improved pivotal connection between the end of a leaf spring and a part of the motor vehicle.

Another object of the invention is to provide a screw-threaded assembly for pivotally connecting one end of a spring to a part of the motor vehicle wherein the parts may be assembled very readily and without difficulty while still obtaining a positively associated relation between the parts.

Other objects will become apparent from the following description, the drawing relative thereto and from the claims hereinafter set forth.

For a better understanding of the invention, reference may be had to the accompanying drawing, forming a part of the specification, wherein.

Figure 1:
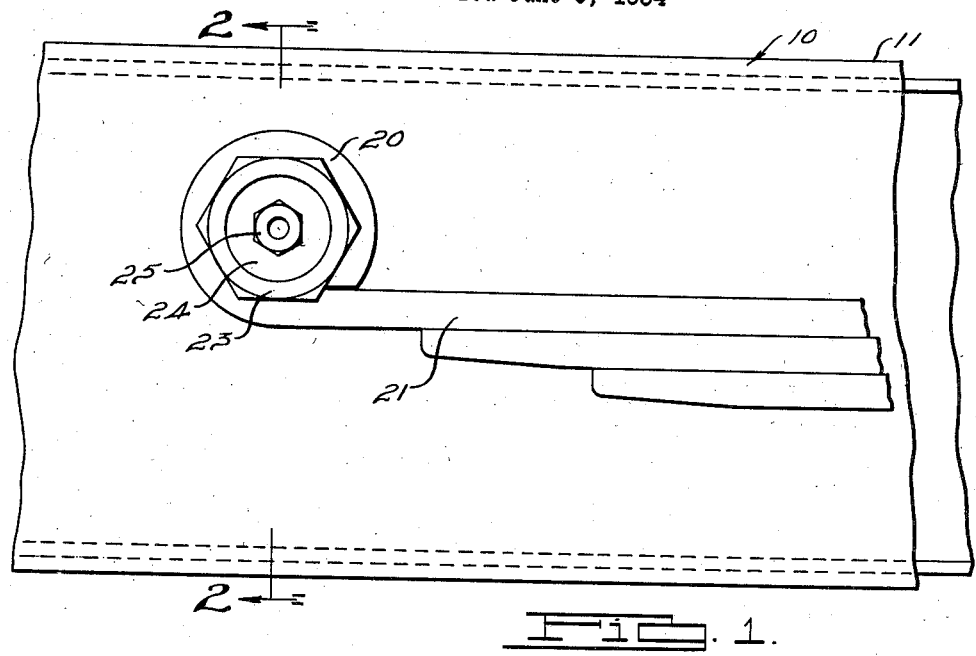
Figure 1 is a fragmentary side elevation view of a motor vehicle frame illustrating a leaf spring pivotally connected thereto according to one form of the invention.
Figure 2:
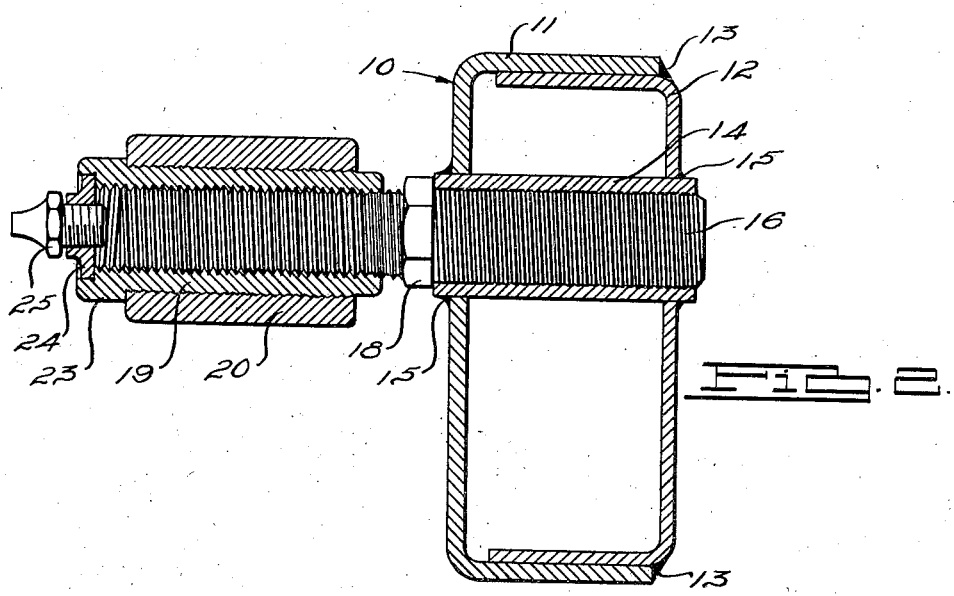
Fig. 2 is a cross-sectional view taken substantially along the line 2—2 of Fig. 1.
Figure 3:
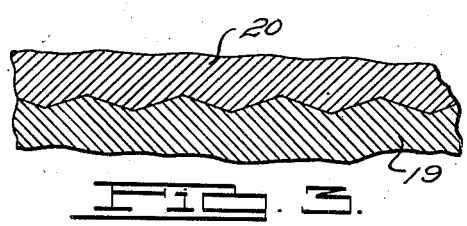
Fig. 3 is a detail view in cross section illustrating threads of self-locking character that are employed in the construction shown by Fig. 2.

Referring to Figs. 1 and 2, the chassis frame member of the vehicle is indicated generally at 10 and this frame member comprises two channels 11 and 12 telescopically associated and which are welded as indicated at 13. The base portions of the channel members 11 and 12 are provided with aligned openings through which a bushing 14 projects and this bushing may be welded to the members at opposed ends as indicated at 15, thereby rigidly holding the bushing in the openings. The bushing is threaded internally and receives one threaded end of a bolt 16 and the threads in the bushing and on this end of the bolt are of self-locking character as shown by Fig. 3 so that when the bolt is screwed into the bushing it normally will be prevented from turning relatively to the latter by the large locking contact between the sides of the threads.

At its outer end, the bolt is somewhat smaller in diameter and this smaller end of the bolt has a standard thread. For threading the bolt into the bushing 14, a hexagonal portion 18 is provided on the bolt, and it will be appreciated that the bolt may be formed from hexagonal stock so as to obtain this hexagonal portion. Next to the head or portion 18, the standard thread is gradually decreased in depth so as to strengthen the bolt at this point, although this variation in the thread has another advantage which will be mentioned hereinafter.

The outer and smaller end of the bolt is threaded into a bushing sleeve 19 and the thread on the internal surface of the sleeve is also of standard character so as to permit free turning or pivotal movement of the bolt and sleeve relatively. This bushing also has an external self-locking thread corresponding to that shown by Fig. 3, and having the same pitch as the internal thread on the bushing, and is threaded into the eye portion 20 of a leaf spring 21. With this arrangement it should be apparent that the bushing will turn with the leaf spring about the bolt whenever any relative turning movement is required during flexing of the spring.

The outer end of the bushing 19 has an apertured hexagonal head 23, and the aperture may be closed by a welch plug 24 having an aperture which is threaded to receive a grease fitting 25.

After the bolt is threaded into the bushing 14 in the frame member, the eye portion 20 of the leaf spring 21 may be slipped over the end of the bolt and then by applying a wrench to the head 23, the bushing 19 may be threaded onto the bolt and into the eye simultaneously. When assembly is effected the bushing 19 normally cannot turn with respect to the eye 20 owing to the self-locking character of the threads and during operation, the leaf spring and bushing freely may pivot on the bolt thus allowing a proper flexing action of the spring as will be readily understood.

During operation of the assembly the bolt 16 normally will not turn and the bushing and spring will oscillate about the bolt. However, if the bolt should loosen in bushing 14 and tend to turn out of the latter, the threads at the left of the head 18 would gradually tighten in the bushing 19 thereby limiting the unthreading movement. In an extreme case where the bolt loosened in bushing 14 and became tightened in bushing 19, the bolt would at least oscillate in bushing 14 before any positive jamming of the parts would occur.

The construction is very simple and can be manufactured inexpensively and assembly of the parts may be readily accomplished without difficulty. All that any operator has to do in assembling the parts is to thread the bolt into the bushing 14 by means of the nut 18, slip the eye portion of the spring over the bolt and then thread the bushing 19 into place and it will be readily appreciated that this may be readily accomplished. The invention provides a very efficient pivotal mounting for the spring and particularly a very economical means for pivotally connecting the end of a leaf spring to the chassis frame of a motor vehicle.

Although only one form of the invention has been illustrated and described in detail, it will be apparent to those skilled in the art that various modifications may be made without departing from the scope of the appended claims.

I claim:

1. In combination, laterally spaced frame portions having openings, an internally threaded bushing projecting through the openings and being welded to the frame portions, and a bolt threaded into the bushing, the threads on the bolt and bushing being of self-locking character.

2. In combination, a chassis frame member having a threaded opening, a bolt having a threaded end threaded into the opening in the frame member and having a threaded end projecting from the opening, the threads on the first mentioned end of the bolt and in said opening being of self-locking character so as to normally hold the bolt against turning, a spring leaf having an internally threaded eye receiving the second mentioned end of the bolt, and an internally and externally threaded sleeve threaded into the eye and on the last mentioned end of the bolt.

3. In combination, a chassis frame member having a threaded opening, a bolt having a threaded end threaded into the opening in the frame member and having a threaded end projecting from the opening, the threads on the first mentioned end of the bolt and in said opening being of self-locking character so as to normally hold the bolt against turning, a spring leaf having an internally threaded eye receiving the second mentioned end of the bolt, and an internally and externally threaded sleeve threaded into the eye and on the last mentioned end of the bolt, the threads between the sleeve and eye being of self-locking character so as normally to lock the eye and sleeve against relative turning and the threads between the sleeve and bolt being of such character as to freely permit relative turning thereof.

4. A bolt having distinct threaded portions, the threads on one portion being shallow and of self-locking character and the threads on the other portion being of such character as to freely permit an element to turn thereon when threaded on such portion.

5. In combination, a chassis frame member, a bolt having a threaded end threaded laterally into the frame member and having its opposite end threaded and projecting laterally from one lateral side of the frame member, a spring extending along and entirely outwardly of such side of the frame member, and means for pivotally supporting one end of the spring on the outer and threaded end of the bolt.

6. In combination, a chassis frame member, a bolt having a threaded end threaded laterally into the frame member and having its opposite end threaded and projecting laterally from one lateral side of the frame member, a spring extending along and entirely outwardly of such side of the frame member, and means for pivotally supporting one end of the spring on the outer and threaded end of the bolt, said means including an eye on the spring having internal self-locking threads and a sleeve bushing having external self-locking threads threadedly engaging the internal self-locking threads in the eye, and also having internal threads engaging the threads on the end of the bolt, the internal threads on the sleeve and on the bolt permitting the spring to pivot on the latter.

7. In combination, a chassis frame member having an opening provided with internal threads of self-locking character, a bolt having self-locking threads on one end engaging the threaded opening and having its opposite end threaded and projecting laterally from one lateral side of the frame member, a spring extending along and entirely outwardly of such side of the frame member, and means pivotally supporting one end of the spring on the threads of such projecting ends of the bolt.

8. In combination, a chassis frame member comprising laterally spaced walls having aligned and laterally directed openings, a sleeve projecting into the openings and being welded at its ends to such walls, threads on the interior of the sleeve, a bolt having a threaded end threaded into the sleeve and having its opposite end threaded and projecting from one lateral side of the frame member, a spring extending along the side of the frame member and entirely outwardly of such side, and threaded means on the spring, threadedly and pivotally engaging such threaded end of the bolt.

9. A bolt having distinct threaded end portions capable of receiving threaded elements thereon from either end of the bolt, and the threads on one portion being of a self-locking character.

10. A bolt having distinct threaded end portions with the threads thereof extending to the ends of the bolt, the threads on one portion being of self-locking character and the threads on the other portion being of such character as to receive and permit a correspondingly threaded element to turn freely thereon.

11. In combination, a chassis frame member having an internally threaded opening therein, a bolt having a threaded portion with threads of a self-locking character engaging the threaded opening and having another portion threaded and projecting laterally from one side of the frame member, a spring extending along and entirely outwardly of said side of the frame member, and means pivotally supporting one end of the spring on the threads of the projecting portion of the bolt, said bolt having a headed portion intermediate said threaded portions and abutting said side of the frame member.

12. A bolt having distinct threaded end portions, the threads on one of said portions being of a normally self-locking character, the threads on the other portion being of such a character as to permit free pivotal movement of a correspondingly threaded element thereon, and means intermediate the ends of said bolt for limiting any threading movement of said self-locking portion.

13. A bolt having distinct threaded portions and a head portion intermediate said portions, the threads on one portion being shallow and of self-locking character and the threads on the other portion being of such character as to receive and permit a correspondingly threaded element to turn freely thereon.

14. A bolt having distinct threaded portions and a head intermediate said portions, the threads on one portion being of self-locking character and the threads on the other portion being of such character as to receive and permit a correspondingly threaded element to turn freely thereon.

15. A bolt having the distinct threaded end portions capable of receiving threaded elements from either end of the bolt, said threaded portions being threaded in the same direction and the threads of one of said portions being of a self-locking character, and means intermediate said threaded portion for limiting the threading movement of cooperating threaded elements towards the intermediate portion of the bolt.

16. In combination, a bolt having threaded end portions and an intermediate head, one of said threaded portions being provided with a shallow self-locking thread and both of said portons being threaded in the same direction, and a threaded bearing member on the opposite end of said bolt, said bearing member having internal threads adapted to cooperate with the bolt thread to form a threaded bearing and having shallow self-locking external threads of the same pitch and direction as said internal threads.

17. In combination, a bolt having an end portion adapted to be fixedly secured to a chassis frame member, threads on the opposite end of said bolt, a sleeve member having internal threads and adapted to be threaded on to said opposite end of the bolt, said sleeve member having exterior self-locking threads of the same pitch and direction as said internal threads.

18. In combination, a bolt having a threaded end portion, a sleeve on the opposite end of said bolt, said bolt and sleeve having cooperating means for preventing relative movement therebetween, a second sleeve member having internal and external threads of equal pitch and threaded in the same direction, said second sleeve being threaded on said first mentioned end of the bolt.

19. In combination, a chassis frame member comprising laterally spaced walls having aligned and laterally directed openings, a bolt having one end extending through both of said openings and supported by said spaced walls with its opposite end projecting laterally from one side of the frame member, said opposite end of the bolt being provided with threads, a spring extending along the side of the frame member and entirely outwardly of said side and threaded means on the spring pivotally engaging said threaded end of the bolt.

JOHN W. LEIGHTON.